United States Patent
Boerhave et al.

[19]

[11] Patent Number: 6,008,756
[45] Date of Patent: Dec. 28, 1999

[54] SYSTEM APPROACH TO RECORDING AND MAPPING SENSOR/ACTUATOR DATA FOR USE IN FILED MAP GENERATION

[75] Inventors: Steven J. Boerhave, Cedar Rapids; John F. Cain, Marion; John K. Russell, Cedar Rapids, all of Iowa

[73] Assignee: Rockwell Collins, Inc., Cedar Rapids, Iowa

[21] Appl. No.: 09/024,282

[22] Filed: Feb. 17, 1998

[51] Int. Cl.[6] .................................................. G01S 5/02
[52] U.S. Cl. ............................................................ 342/357
[58] Field of Search ................................. 342/352, 357; 23/861.73; 364/571.02; 395/356

[56] References Cited

U.S. PATENT DOCUMENTS

| | | | |
|---|---|---|---|
| 5,282,389 | 2/1994 | Faivre et al. ........................ | 73/861.73 |
| 5,343,761 | 9/1994 | Myers .................................. | 73/861.73 |
| 5,369,603 | 11/1994 | Myers .................................. | 364/571.02 |
| 5,561,250 | 10/1996 | Myers .................................. | 73/861.73 |
| 5,592,606 | 1/1997 | Myers .................................. | 395/356 |

*Primary Examiner*—William Oen
*Attorney, Agent, or Firm*—Kyle Eppele; James P. O'Shaughnessy

[57] ABSTRACT

Provided are a method of, and system for, generating agricultural field maps. Latitude and longitude of a GPS receiver carried by a vehicle are determined at predetermined time intervals or positions within the field and are recorded in first and second data channels. First and second characteristics of the field are sensed using first and second agricultural sensor types. The values of the first and second sensed characteristics at different field locations are recorded in third and fourth data channels. At least one of the third and fourth data channels are selected for use in field map generation and the field map is generated as a function of the information recorded in the first and second data channels and as a function of the information recorded in the selected ones of the third and fourth data channels.

11 Claims, 3 Drawing Sheets

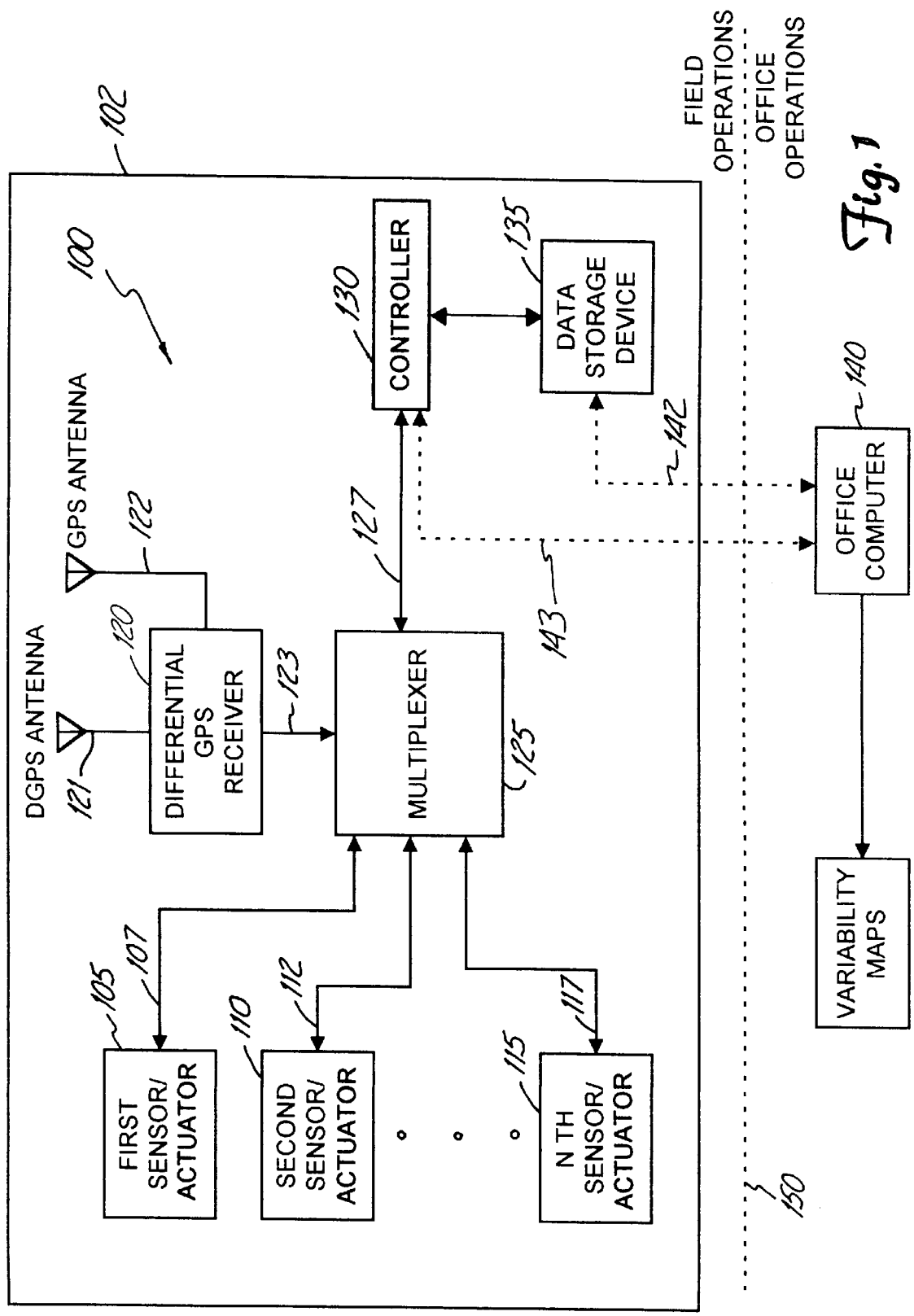

Fig. 2

| CHANNEL 1 | LATITUDE DESIGNATOR AND UNITS | FIRST POSITION LATITUDE | | | | | ○ ○ ○ | |
|---|---|---|---|---|---|---|---|---|
| | 11 | 12 | 13 | 14 | 15 | | | 1N |

| CHANNEL 2 | LONGITUDE DESIGNATOR AND UNITS | FIRST POSITION LONGITUDE | | | | | ○ ○ ○ | |
|---|---|---|---|---|---|---|---|---|
| | 21 | 22 | 23 | 24 | 25 | | | 2N |

| CHANNEL 3 | E-M CONDUCT. DESIG. AND UNITS | FIRST POSITION E-M COND. | | | | | ○ ○ ○ | |
|---|---|---|---|---|---|---|---|---|
| | 31 | 32 | 33 | 34 | 35 | | | 3N |

| CHANNEL 4 | LASER ALTITUDE DESIG. AND UNITS | FIRST POSITION LASER ALTITUDE | | | | | ○ ○ ○ | |
|---|---|---|---|---|---|---|---|---|
| | 41 | 42 | 43 | 44 | 45 | | | 4N |

○
○

| CHANNEL N | SENSOR DESIGNATOR AND UNITS | FIRST POSITION N TH SENSOR VALUE | | | | | ○ ○ ○ | |
|---|---|---|---|---|---|---|---|---|
| | N1 | N2 | N3 | N4 | N5 | | | NN |

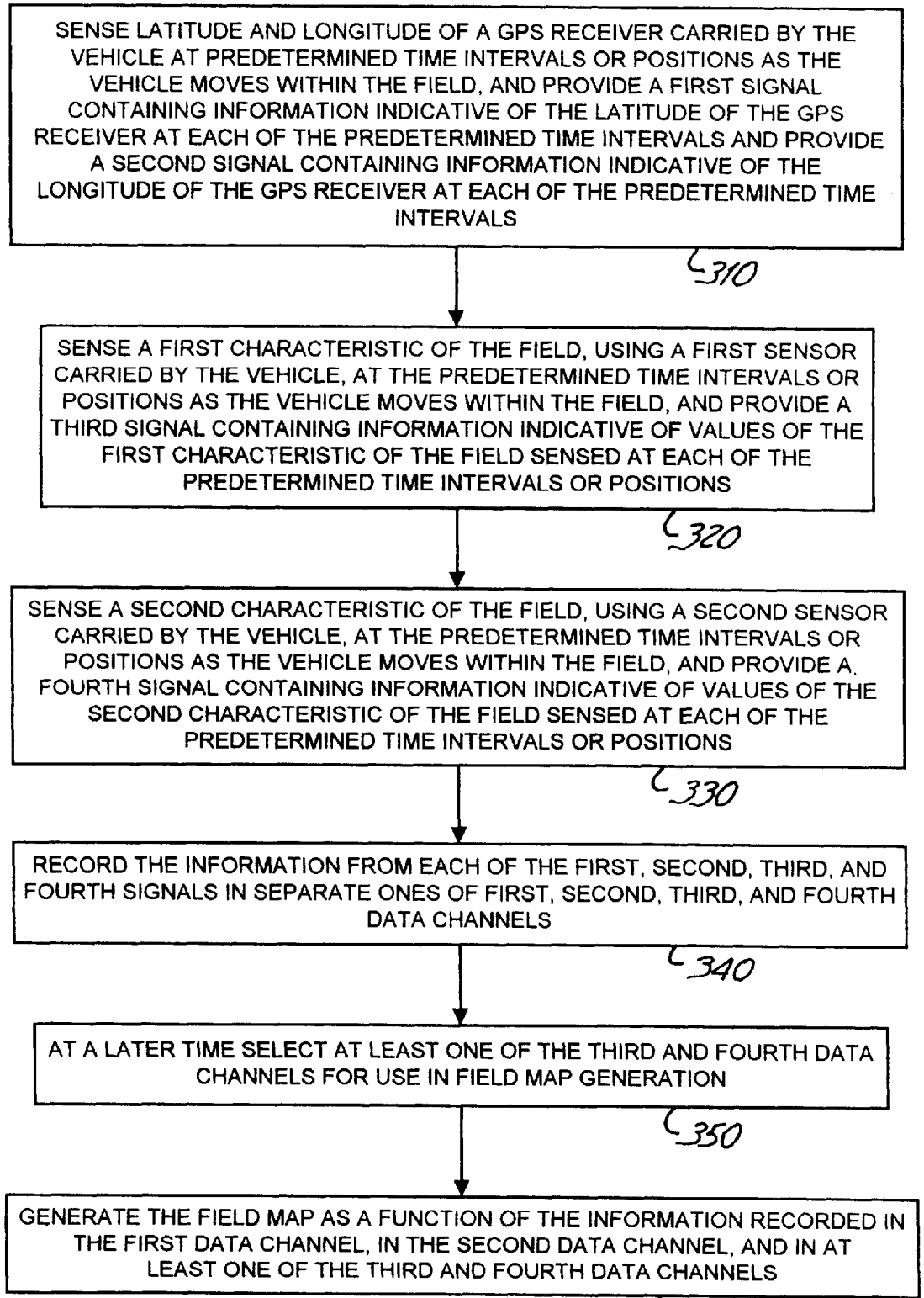

SYSTEM APPROACH TO RECORDING AND MAPPING SENSOR/ACTUATOR DATA FOR USE IN FILED MAP GENERATION

FIELD OF THE INVENTION

The present invention relates to agricultural equipment for recording and mapping agricultural field characteristics. More particularly, the present invention relates to a system for and method of recording field characteristic data such that the data can be used to generate field maps with improved flexibility tailored to illustrate various combinations of the characteristics in a particular map.

BACKGROUND OF THE INVENTION

Fields in which crops are planted rarely have a homogeneous soil composition. Different soil types have a different ability to retain water and nutrients. Also weeds and pests will distribute themselves in a non-uniform fashion across a field. Consequently, if uniform application of fertilizers, pesticides, herbicides, and water is carried out, there will be varied crop yield, pest control, weed control, fungus control, for example. This problem induced the development of customized soil and crop treatment, which has been a very high priority research area in the agricultural industry over the last decade.

Early attempts at customizing soil and crop treatment involved manual mapping of the field, monitoring of soil type and condition, and yield monitoring. Of late, field mapping has become substantially more sophisticated. Global positioning system (GPS) receiver circuitry is now used to accurately geo-reference data from a sensor for use in creating a field map.

As technology in the agricultural area has provided numerous additional sensor types, existing field mapping systems have been unable to accommodate the newly available data. Available agricultural sensors now include electromagnetic conductivity sensors, yield monitoring sensors, laser altitude sensors, depth sensors, moisture sensors, flow rate sensors and plant stand count sensors, for example. Currently in the industry, each time a new type of agricultural sensor is developed, a new piece of interface hardware must be designed to handle the information coming from the sensor. Further, existing systems provide relatively little flexibility in mapping data from multiple types of agricultural sensors.

SUMMARY OF THE INVENTION

Provided are a method of, and system for, generating agricultural field maps. Latitude and longitude of a GPS receiver carried by a vehicle are determined at predetermined time intervals or positions within the field and are recorded in first and second data channels. First and second characteristics of the field are sensed using first and second agricultural sensor types. The values of the first and second sensed characteristics at different field locations are recorded in third and fourth data channels. At least one of the third and fourth data channels are selected for use in field map generation and the field map is generated as a function of the information recorded in the first and second data channels and as a function of the information recorded in the selected ones of the third and fourth data channels.

BRIEF DESCRIPTION OF THE DRAWINGS

FIG. 1 is a block diagram of a system for recording agricultural sensor data from multiple types of sensors in a manner which can be efficiently used to generate field maps illustrating a wide variety of field characteristic combinations.

FIG. 2 is a diagrammatic illustration of a manner in which the agricultural sensor data from multiple types of sensors is stored or recorded in accordance with preferred embodiments of the present invention.

FIG. 3 is a flow diagram illustrating a method of producing field maps indicative of properties of an agricultural field in accordance with embodiments of the present invention.

DETAILED DESCRIPTION OF THE PREFERRED EMBODIMENTS

The present invention includes a system for, and method of, recording and uniquely identifying data transmitted from a variety of types of agricultural sensors and actuators such that each record is tagged with geo-referenced information that subsequently allows the information to be processed into discernible maps and reports. The sensor and actuator data is recorded as data channels in a data file where each channel can then be mapped separately into information layers. The data file also contains unique attribute information for each channel that allows the mapping package to process the data correctly. This systems approach to providing information management to the agricultural market allows producers/growers of agricultural crops to first collect information from the field, and then subsequently generate maps or other reports which allow the information to be analyzed for trends or problems areas. With the data from different sensors/actuators recorded into different channels, great flexibility in map generation is provided by allowing the user to select which channels are to be used in generating any particular map.

FIG. 1 is a block diagram illustrating a system in accordance with the present invention adapted for collecting and recording agricultural sensor data in a manner which provides improved flexibility in the generation of field characteristic maps. System 100 is carried on agricultural vehicle 102 and includes first sensor/actuator 105 and second sensor/actuator 110. The system is easily adaptable and can accommodate the addition of further sensors/actuators. As illustrated in FIG. 1, system 100 also includes Nth sensor/actuator 115. Each of sensors/actuators (hereinafter "sensors") 105, 110 and 115 can be a different one of a wide variety of agricultural sensors including yield sensors, moisture sensors, soil chemistry sensors, weed infestation sensors, flow rate sensors, plant stand counting sensors, electromagnetic sensors, altitude sensors, depth finding sensors, for example. Each of sensors 105, 110 and 115 provides an output on respective signal lines 107, 112 and 117 indicative of the particular characteristic of the field sensed at various field locations during one or more passes over the field by vehicle 102.

GPS receiver 120 of system 100 includes differential GPS antenna 121 and GPS antenna 122 for receiving GPS signals from satellites or other sources. GPS receiver 120 provides at output 123 information indicative of the latitude and longitude of vehicle 102 at the various field locations. Multiplexer 125 converts the information signals provided at outputs 107, 112, 117 and 123 into a serial data stream containing information from each of first sensor 105, second sensor 110, Nth sensor 115 and GPS receiver 120. In other embodiments, multiplexer 125 is omitted and sensor outputs 107, 112, 117 and 123 are provided to controller 130 in some other manner.

TABLE 1

Example Data File Header Format

| Rec # | Item | Start Byte | Count Bytes |
|---|---|---|---|
| 1 | file header | * | * |
| 2 | version # | * | * |
| 3 | setup name | * | * |
| 4 | field name | * | * |
| 5 | Vehicle ID | * | * |
| 6 | Reserved | * | * |
| 7 | display ID | * | * |
| 8 | Sensor/Act Type | * | * |
| 9 | Delay | * | * |
| 10 | X Offset | * | * |
| 11 | Y Offset | * | * |
| 12 | Crop Type Name | * | * |
| 13 | Hybrid Name | * | * |
| 14 | Load Number | * | * |
| 15 | Row Type Selection | * | * |
| 16 | # of harvest heads | * | * |
| 17 | Data Max | * | * |
| 18 | Data Min | * | * |
| 19 | Dry Moisture | * | * |
| 20 | Density | * | * |
| 21 | Width of each row | * | * |
| 22 | Row Count | * | * |
| 23 | # Items Recorded | * | * |
| 24 | Identity of Item #1 | * | * |
| 25 | item #1 units | * | * |
| . | . | * | * |
| 26 | Identity of Item #x | * | * |
| 27 | item #X units | * | * |

TABLE 2

Data File Data Format

| Rec # | Item | Start Byte | Count Bytes |
|---|---|---|---|
| 1 | Data header | * | * |
| 2 | Differential indicator | * | * |
| 3 | DOP Validity Status | * | * |
| 4 | Distance Traveled | * | * |
| 7 | UTC time of week | * | * |
| 8 | date | * | * |
| 9 | latitude | * | * |
| 10 | longitude | * | * |
| 11 | altitude | * | * |
| 12 | heading | * | * |
| 13 | ground speed | * | * |
| 13a | GDOP | * | * |
| 13b | PDOP | * | * |
| 13c | HDOP | * | * |
| 13d | VDOP | * | * |
| 14 | mode of section 1–32 | * | * |
| 15 | mode of section 33–64 | * | * |
| 16 | value of item 1 | * | * |
|  | value of item x | * | * |

Controller 130 receives data from the sensors and/or from a user input, and formats this data for storage in storage device 135. Table 1 illustrates one possible format of a header portion of a data packet provided to data storage device 135. The header portion of the data packet contains information that does not change frequently, and therefore will preferably only be transferred as often as is required by the system. Records 1 through 7 transmitted as part of the serial data stream header portion provide various field, vehicle and software identification information. Record number 8 identifies sensor actuator types. Record number 9 identifies a delay between the occurrence of a particular characteristic at a particular position in the field and the time that the sensor output reflects the occurrence of that value. Records 10 and 11 can be used to identify an offset in two directions of the GPS receiver antennas from the sensors or other portions of the vehicle.

Records 12–22 can be used to provide initial information relating to a number of crop characteristics or designations. For example, record number 22 provides an indication of the number or rows within the vehicle swath. Record number 23 provides an indication of the number of field characteristics sensed. For example, in a scenario where vehicle 102 carries only first and second sensors 105 and 110, record number 23 of the header would indicate that two items are recorded.

Records 24 and 25 illustrated in Table 1 provide an identity of a first particular field characteristic sensed, and the units of measurement associated with that field characteristic. Records 26 and 27 provide the same information for the second recorded item (field characteristic). Likewise, if additional sensors are included to provide additional field characteristic information, the data file header portion of the serial data stream would include yet other records identifying the characteristic and corresponding units of measurement.

Preferably, when implementing a particular system such as system 100, the data byte at which each record is expected to begin within the serial data stream, as well as the length of each record, is established in advance so that this information need not be transmitted. The starting point (i.e., start byte) and length (i.e., count byte) of each record could be stored in an instruction table such as Table 1 and Table 2 for use in later sorting the data.

Table 2 illustrates a data format which can be used to transfer sensor and GPS position information for each incremental field position. Generally the data portion information changes about once per second, and is therefore updated at about that rate. Records 1 through 8 of the data file data portion provide various time, distance traveled and date information. Records 9 and 10 provide latitude and longitude information from the GPS receiver 120. Records 12–15 provide other logistical data and can be tailored for the particular implementation of system 100. Record 16 provides the value of each sensed characteristic from one of sensors 105, 110 and 115. With the data file data portion updated at a rate of about once per second, the latitude and longitude information, as well as one or more sensed characteristics of the field or crop, are included in the data transfer for various incremental locations within the field.

As illustrated in FIG. 1, system 102 includes controller 130 which can be a microprocessor, a programmable logic controller, or other control circuitry. Controller 130 receives the serial data stream from multiplexer 125. Using information stored in controller memory, such as information of the type provided in tables 1 and 2 described above, controller 130 can retrieve, identify and sort information from serial data stream 127. The sorted information is stored in data channels or arrays within data storage device 135. At a later time, an office computer 140 can retrieve the information stored or recorded in the data channels within data storage device 135. Retrieval of the stored information from data storage device 135 can occur either through direct connection 142 temporarily made between office computer 140 and data storage device 135, or through a connection 143 temporarily made between office computer 140 and controller 130. Alternatively, the connection can be made through a magnetic media, a solid state device, an RF link, an infrared link, or through any other type of data transfer device or procedure. Then, a user of office computer 140 can select which data channels, corresponding to the information from one or more of the agricultural sensors, are to be used along with latitude and longitude information to create various field maps.

FIG. 2 is a diagrammatic illustration of a data channel recording format which can be used in accordance with embodiments of the present invention. Each channel includes multiple records or cells at which information corresponding to different field locations is stored within data storage device 135. In other words, each channel forms an array of values for a particular parameter (i.e., latitude, longitude or a sensed field characteristic) corresponding to various incremental field locations. Particular cells or records within each data channel are correlated to corresponding cells or records in other data channels to form a two-dimensional array.

As illustrated in FIG. 2, CHANNEL 1 can include first record 11 which provides a designation that CHANNEL 1 contains latitude information, as well as the corresponding units of measurement. Record 12 contains information indicative of the latitude of GPS receiver 120 while vehicle 102 was at a first position within the field. Similarly, records 13, 14, 15 . . . 1N of CHANNEL 1 contain latitude information corresponding to subsequent positions of GPS receiver 120 and vehicle 102 within the field.

As illustrated in FIG. 2, CHANNEL 2 can include first record 21 which provides a designation that CHANNEL 2 contains longitude information, as well as the corresponding units of measurement. Record 22 contains information indicative of the longitude of GPS receiver 120 while vehicle 102 was at the first position within the field. With the combination of records 12 and 22 in CHANNELS 1 and 2, the latitude and longitude of the first field position can be identified and used to geo-reference to corresponding sensor data. Similarly, records 23, 24, 25 . . . 2N of CHANNEL 2 contain longitude information corresponding to the subsequent positions of GPS receiver 120 and vehicle 102 within the field.

In the example provided in FIG. 2, CHANNEL 3 contains electromagnetic conductivity measurement values from an electromagnetic conductivity sensor, taken at the various locations within the field. As was the case in CHANNELS 1 and 2, CHANNEL 3 includes record 31 containing a designation or identifier that the channel contains electromagnetic conductivity values sensed from an electromagnetic conductivity sensor aboard vehicle 102. For example, record or cell 32 of CHANNEL 3 contains an electromagnetic conductivity value corresponding to the first position within the field having the latitude recorded at cell 12 of CHANNEL 1 and the longitude recorded at cell 22 of CHANNEL 2. Cells 33, 34, 35 . . . 3N of CHANNEL 3 contain other electromagnetic conductivity values sensed at various other field locations identifiable by the latitude and longitude values stored in the corresponding cells of CHANNELS 1 and 2.

In the example illustrated in FIG. 2, CHANNEL 4 includes cell 41 which contains a designation or indication that CHANNEL 4 is used to record laser altitude information obtained from a laser altitude sensor aboard vehicle 102. As an example, record or cell 42 of CHANNEL 4 contains a first laser altitude value corresponding to the first position in the field having the latitude recorded at record 12 of CHANNEL 1 and the longitude recorded at record 22 of CHANNEL 2. Records or cells 43, 44, 45 . . . 4N of CHANNEL 44 contain laser altitude values sensed at locations of vehicle 102 which are identifiable by the latitude and longitude values stored in the corresponding cells of CHANNELS 1 and 2. In the same manner, additional field characteristics sensed by further sensors are recorded in additional channels.

By sorting and storing the field characteristic data in the manner illustrated in FIG. 2, increased flexibility and variability are provided to the user of office computer 140. The user of office computer 140 can select any combination of one or more channels containing sensor data (i.e. CHANNELS 3-N) to be mapped against the latitude and longitude position information recorded in CHANNELS 1 and 2. To add additional layers of information, additional sensor data is stored in additional channels in the same geo-referenced format. Thus, the present invention provides a highly adaptable system and format which can readily accommodate new types of sensors without designing new hardware and software interfaces to accommodate the new sensor types.

FIG. 3 is a flow diagram illustrating one embodiment of the preferred methods of the present invention of creating field maps indicative of properties of an agricultural field. First, as shown at block 310, latitude and longitude of a GPS receiver carried by a vehicle at predetermined time intervals or positions are sensed as the vehicle moves within the field. In response to the sensed latitudes and longitudes, a first signal is provided containing information indicative of the latitudes of the GPS receiver at each of the predetermined time intervals or positions, and a second signal is provided containing information indicative of the longitudes of the GPS receiver at each of the predetermined time intervals or positions.

Next, as shown at block 320, a first characteristic of the field is sensed, using a first sensor carried by the vehicle, at the predetermined time intervals or positions as the vehicle moves within the field. In response to the sensed first field characteristic, a third signal is provided which contains information indicative of values of the first characteristic of the field sensed at each of the predetermined time intervals or positions. Likewise, as shown at block 330, a second characteristic of the field is sensed, using a second type of sensor carried by the vehicle, at the predetermined time intervals or positions as the vehicle moves within the field. In response to the sensed second field characteristic, a fourth signal is provided which contains information indicative of values of the second characteristic of the field sensed at each of the predetermined time intervals or positions.

Next, as illustrated at block 340, the information from each of the first, second, third and fourth signals is recorded in separate ones of first, second, third and fourth data channels. The first data channel contains in different ones of an array of first channel data cells information indicative of the latitude of the GPS receiver at different ones of the predetermined time intervals or positions. The second data channel contains in different ones of an array of second channel data cells information indicative of the longitude of the GPS receiver at different ones of the predetermined time intervals or positions. The third data channel contains in different ones of an array of third channel data cells information indicative of the values of the first characteristic of the field sensed at different ones of the predetermined time intervals or positions. The fourth data channel contains in different ones of an array of fourth channel data cells information indicative of the values of the second characteristic of the field sensed at different ones of the predetermined time intervals or positions.

Next, as shown at block 350, at least one of the third and fourth data channels are selected for use in field map generation. The third data channel is selected when the field map is to map the first characteristic of the field against latitude and longitude. The fourth data channel is selected when the field map is to map the second characteristic of the field against latitude and longitude. Both of the third and fourth data channels are selected when the field map is to simultaneously map both of the first and second characteristics of the field against latitude and longitude. Finally, as illustrated at block 360, the field map is generated as a function of the information recorded in the first data channel, in the second data channel and in the selected ones of the third and fourth data channels.

Although the present invention has been described with reference to preferred embodiments, workers skilled in the art will recognize that changes may be made in form and detail without departing from the spirit and scope of the invention.

What is claimed is:

1. A method of creating field maps indicative of properties of an agricultural field, the method comprising:

sensing latitude of a global positioning system (GPS) receiver carried by a vehicle at predetermined time intervals as the vehicle moves within the field, and providing a first signal containing information indicative of the latitude of the GPS receiver at each of the predetermined time intervals;

sensing longitude of the global positioning system receiver carried by the vehicle at the predetermined time intervals as the vehicle moves within the field, and providing a second signal containing information indicative of the longitude of the GPS receiver at each of the predetermined time intervals;

sensing a first characteristic of the field, using a first sensor carried by the vehicle, at the predetermined time intervals as the vehicle moves within the field, and providing a third signal containing information indicative of values of the first characteristic of the field sensed at each of the predetermined time intervals;

sensing a second characteristic of the field, using a second sensor carried by the vehicle, at the predetermined time intervals as the vehicle moves within the field, and providing a fourth signal containing information indicative of values of the second characteristic of the field sensed at each of the predetermined time intervals;

recording the information from each of the first, second, third and fourth signals in separate ones of first, second, third and fourth data channels, wherein the first data channel contains in different ones of a plurality of first channel data cells information indicative of the latitude of the GPS receiver at different ones of the predetermined time intervals, wherein the second data channel contains in different ones of a plurality of second channel data cells information indicative of the longitude of the GPS receiver at different ones of the predetermined time intervals, wherein the third data channel contains in different ones of a plurality of third channel data cells information indicative of the values of the first characteristic of the field sensed at different ones of the predetermined time intervals, wherein the fourth data channel contains in different ones of a plurality of fourth channel data cells information indicative of the values of the second characteristic of the field sensed at different ones of the predetermined time intervals;

selecting at least one of the third and fourth data channels for use in field map generation, wherein the third data channel is selected when the field map is to map the first characteristic of the field, wherein the fourth data channel is selected when the field map is to map the second characteristic of the field, and wherein the third and fourth data channels are selected when the field map is to map the first and second characteristics of the field simultaneously; and generating the field map as a function of the information recorded in the first data channel, in the second data channel and in the at least one of the third and fourth data channels.

2. The method of claim 1, and before the step of recording further comprising converting the first, second, third and fourth signals into a single serial data stream indicative of the latitude, the longitude, the first characteristic and the second characteristic.

3. The method of claim 1, and further comprising:

sensing a third characteristic of the field using a third sensor carried by the vehicle at the predetermined time intervals as the vehicle moves within the field, and providing a fifth signal containing information indicative of values of the third characteristic of the field sensed at each of the predetermined time intervals;

recording the information from the fifth signal in a fifth data channel, wherein the fifth data channel contains in different ones of a plurality of fifth channel data cells information indicative of the values of the third characteristic of the field sensed at different ones of the predetermined time intervals;

selecting the fifth data channel for use in field map generation; and generating the field map as a function of the information recorded in the fifth data channel.

4. The method of claim 1, wherein the first sensor includes an electromagnetic conductivity sensor and sensing a first characteristic of the field includes sensing electromagnetic conductivity in the field.

5. The method of claim 1, wherein the first sensor includes a yield monitoring sensor and sensing a first characteristic of the field includes sensing a crop yield in the field.

6. The method of claim 1, wherein the first sensor includes a laser altitude sensor and sensing a first characteristic of the field includes sensing altitudes of surfaces in the field.

7. The method of claim 1, wherein the first sensor includes a moisture sensor and sensing a first characteristic of the field includes sensing moisture content of soil in the field.

8. The method of claim 1, wherein the first sensor includes a flow rate sensor and sensing a first characteristic of the field includes sensing a flow rate of a crop harvest.

9. The method of claim 1, wherein the first sensor includes a plant stand counting sensor and sensing a first characteristic of the field includes sensing a plant stand count in the field.

10. A system for generating field maps of agricultural fields, the system comprising:

first sensor means carried by a vehicle for sensing a first characteristic of the field at various field locations during a first pass over the field by the vehicle;

second sensor means carried by the vehicle for sensing a second characteristic of the field at the various field locations during the first pass over the field;

position sensing means carried by the vehicle for sensing a latitude and a longitude of the first and second sensor means at the various field locations during the first pass over the field;

means for storing adapted to store the latitude of the first and second sensor means at the various field locations during the first pass over the field in a first data channel, adapted to store the longitude of the first and second sensor means at the various field locations during the first pass over the field in a second data channel, adapted to store the first characteristic of the field at the various field locations in a third data channel, and adapted to store the second characteristic of the field at the various field locations in a fourth data channel;

map generation means for generating a field map as a function of latitude data stored in the first data channel, as a function of longitude data stored in the second data channel, and as a function of at least a selected one of first characteristic data stored in the third data channel and second characteristic data stored in the fourth data channel.

11. The system of claim 10, and further comprising means for a user of the system to select the first characteristic data stored in the third data channel, the second characteristic data stored in the fourth data channel, or both of the first and second characteristic data stored in the third and fourth data channels for use in generating the field map.

* * * * *